(12) United States Patent
Peterson

(10) Patent No.: US 8,744,036 B2
(45) Date of Patent: Jun. 3, 2014

(54) HIGH POWER DENSITY LIQUID-COOLED PEBBLE-CHANNEL NUCLEAR REACTOR

(75) Inventor: Per F. Peterson, Berkeley, CA (US)

(73) Assignee: The Regents of the University of California, Oakland, CA (US)

( * ) Notice: Subject to any disclaimer, the term of this patent is extended or adjusted under 35 U.S.C. 154(b) by 556 days.

(21) Appl. No.: 12/776,599

(22) Filed: May 10, 2010

(65) Prior Publication Data

US 2010/0296620 A1 Nov. 25, 2010

Related U.S. Application Data

(63) Continuation of application No. PCT/US2008/083234, filed on Nov. 12, 2008.

(60) Provisional application No. 60/987,222, filed on Nov. 12, 2007.

(51) Int. Cl.
*G21C 15/00* (2006.01)
*G21C 3/30* (2006.01)
*G21C 7/107* (2006.01)

(52) U.S. Cl.
CPC . *G21C 3/30* (2013.01); *G21C 7/107* (2013.01)
USPC ............ 376/395; 376/347; 376/361; 376/381

(58) Field of Classification Search
CPC .............. G21C 3/00; G21C 3/02; G21C 3/30; G21C 7/00; G21C 7/06; G21C 7/08; G21C 7/10; G21C 7/107; G21C 15/00; G21C 15/20
USPC ......... 376/333, 381, 382, 411, 412, 430, 458, 376/459, 361, 409, 426, 427
See application file for complete search history.

(56) References Cited

U.S. PATENT DOCUMENTS 3,223,589 A * 12/1965 Ziegler .......................... 376/219
5,680,424 A * 10/1997 Foster ........................... 376/458

FOREIGN PATENT DOCUMENTS

JP 54-039798 A 4/1979
KR 10-0756440 B1 9/2007

(Continued)

OTHER PUBLICATIONS

Fardin et al., Preliminary study of the Pebble-Bed Advanced High Temperature Reactor, Report UCBTH-06-001, Aug. 2006, University of California, Berkley.*

(Continued)

*Primary Examiner* — Jack W Keith
*Assistant Examiner* — Marshall O'Connor
(74) *Attorney, Agent, or Firm* — John P. O'Banion

(57) ABSTRACT

A high-temperature nuclear reactor, cooled by a liquid fluoride salt, is described. The reactor uses an annular fuel pebble comprised of an inert graphite center kernel, a TRISO fuel particles region, and a graphite outer shell, with an average pebble density lower than the density of the liquid salt so the pebbles float. The pebbles are introduced into a coolant entering the reactor and are carried into the bottom of the reactor core, where they form a pebble bed inside a plurality of vertical channels inside one or more replaceable Pebble Channel Assemblies (PCAs). Pebbles are removed through defueling chutes located at the top of each PCA. Each PCA also includes channels for insertion of neutron control and shutdown elements, and channels for insertion of core flux mapping and other instrumentation.

17 Claims, 11 Drawing Sheets

(56) References Cited

FOREIGN PATENT DOCUMENTS

| KR | 10-0772063 B1 | 11/2007 |
|---|---|---|
| WO | 02/01576 A1 | 1/2002 |

OTHER PUBLICATIONS

Ingersoll et al., Status of Preconceptual Design of the Advanced High-Temperature Reactor (AHTR), ORNL/TM-2004/104, May 2004, Oak Ridge National Laboratory.*

Ingersoll et al., Trade Studies for the Liquid-Salt-Cooled Very High-Temperature Reactor: Fiscal Year 2006 Progress Report, ORNL/TM-2006/140, Feb. 2007, US DOE.*

Bardet, P. et al.—"The Pebble Recirculation Experiment (PREX) for the AHTR"—Global 2007, Sep. 9-12, 2007, Boise, Idaho.

Fratoni, M. et al.—"Neutronic and Depletion Analysis of the PB-AHTR"—Global 2007, Sep. 9-12, 2007, Boise, Idaho.

Griveau, A. et al.—"Transient Thermal Response of the PB-AHTR to Loss of Forced Cooling"—Global 2007, Sep. 9-12, 2007, Boise, Idaho.

Bardet, P. et al.—"Design, Analysis and Development of the Modular PB-AHTR"—2008 International Congress on Advances in Nuclear Power Plants (ICAPP '08), Anaheim, CA, Jun. 8-12, 2008.

Blandford, E.D. et al.—"A Novel Buoyantly-Driven Shutdown Rod Design for Passive Reactivity Control of the PB-AHTR"—Proc. of the 4th International Topical Meeting on High Temperature Reactor Technology, Washington DC, Sep. 28-Oct. 1, 2008.

Robertson, R.C.,—"Conceptual Design Study of a Single-Fluid Molten-Salt Breeder Reaction", Chapter 3, "Reactor Primary System"—ORNL-4541, Jun. 1971.

Forsberg, C.W. et al.—"Molten Salt-Cooled Advanced High-Temperature Reactor for Production of Hydrogen and Electricity"—Nuclear Technology, vol. 144, pp. 289-302, Dec. 2003.

de Zwaan, S.J. et al.—"Static design of a liquid-salt-cooled pebble bed reactor (LSPBR)"—Annals of Nuclear Energy, vol. 34, pp. 83-92, 2007.

Tallackson, J.R.—"Thermal Radiation Transfer of Afterheat in MSBR Heat Exchangers"—Oak Ridge National Laboratory (ORNL-TM-3145), Mar. 1971.

McWherter, J.R.—"Molten Salt Breeder Experiment Design Bases"—Oak Ridge National Laboratory (ORNL-TM-3177), p. 26, Nov. 1970.

ISA/KR, international search report from counterpart application PCT/US2008/083234, issued Oct. 1, 2009.

ISA/KR, Written Opinion from counterpart application PCT/US2008/083234, issued Oct. 1, 2009.

\* cited by examiner

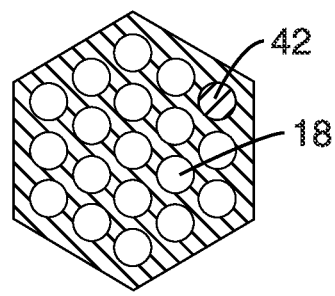
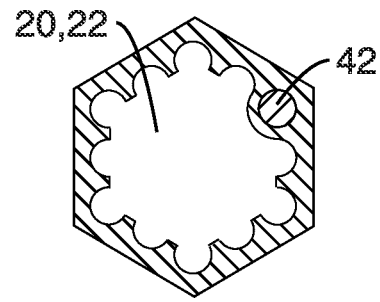
FIG. 5A
FIG. 5B
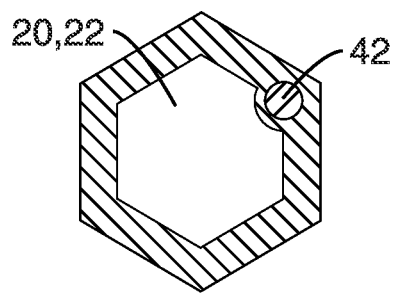
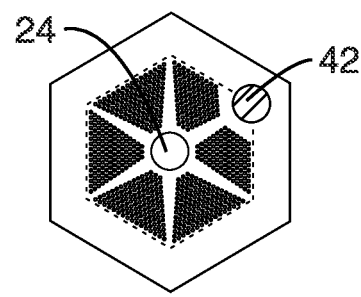
FIG. 5C
FIG. 5D
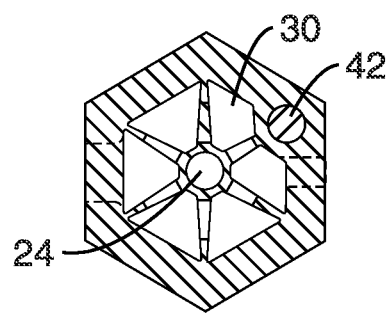
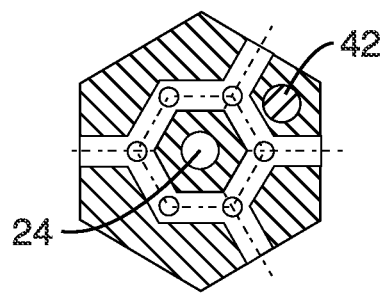
FIG. 5E
FIG. 5F

HIGH POWER DENSITY LIQUID-COOLED PEBBLE-CHANNEL NUCLEAR REACTOR

CROSS-REFERENCE TO RELATED APPLICATIONS

This application claims priority from, and is a 35 U.S.C. §111(a) continuation of, PCT international application number PCT/US2008/083234 filed on Nov. 12, 2008, incorporated herein by reference in its entirety, which claims priority from U.S. provisional patent application Ser. No. 60/987,222 filed on Nov. 12, 2007, incorporated herein by reference in its entirety.

STATEMENT REGARDING FEDERALLY SPONSORED RESEARCH OR DEVELOPMENT

This invention was made with Government support from the DOE-NE Nuclear Energy Research Initiative, Contract No. DE-FC07-05ID14669. The Government has certain rights in this invention.

This application is also related to PCT International Publication No. WO 2009/097037 published on Aug. 6, 2009, incorporated herein by reference in its entirety.

INCORPORATION-BY-REFERENCE OF MATERIAL SUBMITTED ON A COMPACT DISC

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. §1.14.

BACKGROUND OF THE INVENTION

1. Field of the Invention

This invention pertains generally to nuclear reactor design, and more particularly to a liquid-fluoride-salt cooled high-temperature nuclear reactor using pebble fuel that achieves high power density.

2. Description of Related Art

Current high temperature reactors, such as the Pebble Bed Modular Reactor (PBMR), use helium as a coolant. Helium-cooled high temperature reactors (HTRs) with prismatic and pebble fuels have been extensively studied and developed, and are well known in the art. Likewise molten fluoride salts were developed in the 1950's as solvents for fluid-fueled nuclear reactors. More recently, reactors using clean liquid fluoride salt as a coolant, and solid prismatic or pebble fuel of similar type to that for helium cooled HTRs, have been proposed.

Each of the following publications which provides additional background information and is incorporated herein by reference in its entirety:

P. Bardet, J. Y. An, J. T. Franklin, D. Huang, K. Lee, M. Toulouse and P. F. Peterson, "The Pebble Recirculation Experiment (PREX) for the AHTR," submitted to Global 2007, Boise, Id., Sep. 9-13, 2007.

M. Fratoni, F. Koenig, E. Greenspan, and P. F. Peterson, "Neutronic and Depletion Analysis of the PB-AHTR," Global 2007, Boise, Id., Sep. 9-13, 2007.

A. Griveau, F. Fardin, H. Zhao, and P. F. Peterson, "Transient Thermal Response of the PB-AHTR to Loss of Forced Cooling," Global 2007, Boise, Id., Sep. 9-13, 2007.

P. Bardet, E. Blandford, M. Fratoni, A. Niquille, E. Greenspan, and P. F. Peterson, "Design, Analysis and Development of the Modular PB-AHTR," 2008 International Congress on Advances in Nuclear Power Plants (ICAPP '08), Anaheim, Calif., Jun. 8-12, 2008.

E. D. Blandford and P. F. Peterson, A Novel Buoyant Shutdown Rod Design for the Passive Reactivity Control of the PB-AHTR," 4th International Topical Meeting on High Temperature Reactor Technology, Washington, D.C., Sep. 28-Oct. 1, 2008.

R. C. Robertson, 6/71 "Conceptual Design Study of a Single-Fluid Molten-Salt Breeder Reactor," Chapter 3, "Reactor Primary System," ORNL-4541, June, 1971.

C. W. Forsberg, P. Pickard and P. F. Peterson, "Molten-Salt-Cooled Advanced High-Temperature Reactor for Production of Hydrogen and Electricity," *Nuclear Technology*, 144, pp. 289-302 (2003).

S. J. de Zwann, B. Boer, D. Lathouwers and J. L. Kloosterman, "Static design of a liquid-salt-cooled pebble bed reactor (LSPBR)," *Annals of Nuclear Energy* 34 (2007) 83-92.

Tallackson, J. R., "Thermal Radiation Transfer of Afterheat in MSBR Heat Exchangers," ORNL-TM-3145, 3/71.

McWherter, J. R., "Molten Salt Breeder Experiment Design Bases," ORNL-TM-3177, pg. 26, 11/70.

A practical realization of a liquid-salt cooled high temperature reactor could bring major benefits to nuclear energy by enabling the excellent passive safety and high power conversion efficiency of helium cooled reactors to be achieved, but in a more compact, high power density, low pressure reactor.

BRIEF SUMMARY OF THE INVENTION

The present invention pertains to a novel Modular Pebble Bed Advanced High Temperature Reactor (PB-AHTR) design which achieves high power density with greatly reduced reactor size and cost.

One aspect of the invention involves using a large number of parallel, pebble filled flow channels in replaceable graphite reflector blocks. Another aspect of the invention involves using pebbles with smaller diameter than used in helium cooled pebble bed reactors to increase the heat transfer surface area and reduce the fuel temperature. A still further aspect of the invention is a method to introduce and remove pebbles from the reactor core, so that the pebbles can be recirculated multiple times through the core and depleted pebbles replaced with fresh pebbles to maintain core reactivity.

Advantages of using the channel-core configuration include: (1) a significant reduction of the volume fraction of salt in the core, improving reactivity and discharge burn up; (2) neutron moderation by the reflector graphite, allowing higher heavy metal loading in the pebbles and reducing the number of pebbles requiring manufacture and the spent fuel volume; (3) the capability to recirculate high burn up pebbles to the center of the core to flatten the core power distribution; (4) improved response of the pebble core to seismic loads;

and (5) the ability to provide locations in the central, high flux region of the core for the insertion of control and safety rods.

Another aspect of the invention involves pebble fuel design and reactivity control for a liquid-cooled pebble-channel nuclear reactor.

In one embodiment, the pebble fuel is designed to have an inert graphite kernel, surrounded by an annular fuel region with fuel particles, with a protective coating of graphite on the exterior of the pebble. The use of an inert graphite kernel with an annular fuel region decreases the fuel temperature significantly compared to the conventional homogeneous fuel distribution in a fuel pebble, which brings benefits in the response of the reactor to Anticipated Transient Without Scram (ATWS) transients. Adjustment of the density of the kernel allows the pebble density and buoyancy in the liquid coolant to be controlled.

In another embodiment, the reactor uses control and shutdown elements that are neutrally buoyant in the salt at a temperature somewhat above the normal core inlet temperature and below the normal core outlet temperature. Flow through the control channel may come from the core inlet plenum or an intermediate location in the core, so that under transients where the primary pumps stop or the coolant entering the control channel temperature rises above the design temperature, the elements drop into channels in and around the core without external activation. These control elements may be fabricated from a combination of graphite (density of 1.7 g/cc or less) and boron carbide (density of 2.5 g/cc), in appropriate proportion to provide neutral buoyancy in the liquid coolant (nominally 0.1967 g/cc at 640° C.). The buoyant element or elements may have various shapes, including cylinders, spheres, and cruciforms, or combinations thereof. The optimal geometry may consist of a single vertical element with a cruciform cross section in its center and cylindrical cross sections at its ends, with dimensions selected to (1) optimize the cross-sectional area to maximize the terminal drop velocity via the balance between buoyancy forces (increased cross sectional area) and drag forces (decreasing cross sectional area and perimeter), (2) maximize the effectiveness of neutron absorption in the center region of the element (cruciform geometry), (3) facilitate active insertion of the element using an externally activated control rod applying force to the top of element, and (4) facilitate passive stopping of the element upon reaching the bottom of the channel (for example, with a cylindrical section entering into a dash pot at the bottom of the channel).

In another embodiment of the invention, the reactor uses a fuel pebble with density lower than the liquid coolant density, and the defueling chute is positioned to remove the pebbles above the core, rather than below the core as is the practice with conventional helium-cooled pebble bed reactors. This configuration takes advantage of the fact that it is easier to fabricate pebbles that are less dense than salt than more dense, and that it is preferred to have the defueling machine above the core for a pool-type reactor configuration.

In a further embodiment, the reactor uses water, with plastic spheres fabricated from a material like polyethylene, scaled to approximately 50% of the prototypical scale, to generate experimental data for pebble motion to be used in licensing of liquid-cooled pebble bed reactors. This method for experimental validation for licensing has lower cost than using experiments with the prototypical high-temperature salt and pebbles.

Another aspect of the invention is to provide a method to recirculate fuel pebbles in a liquid-salt cooled, high temperature reactor core to permit refueling.

Another aspect of the invention is to fabricate pebbles that are positively buoyant in the coolant and have reduced stored energy.

Another aspect of the invention is to provide a method to passively or actively insert neutron control elements into the center region of the core to control the reactor power.

Another aspect of the invention is to provide a method to increase moderation of neutrons in the core and allow higher pebble heavy metal loading.

Another aspect of the invention is to provide a method to prevent ingress of cover gas into the core if the primary salt inventory is reduced.

Another aspect of the invention is to provide a method to connect the graphite radial reflector structure to the reactor vessel that sustains the structure in compression, and to provide a method to support the reflector structure during initial assembly, heating, and filling of the reactor vessel with salt.

Further aspects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only:

FIG. 5A through FIG. 5F are schematic cross-sectional views of the PCA shown in FIG. 4 taken through lines 5A-5A, 5B-5B, 5C-5C, 5D-5D, 5E-5E and 5F-5F, respectively.

DETAILED DESCRIPTION OF THE INVENTION

Introduction

Figure 1:
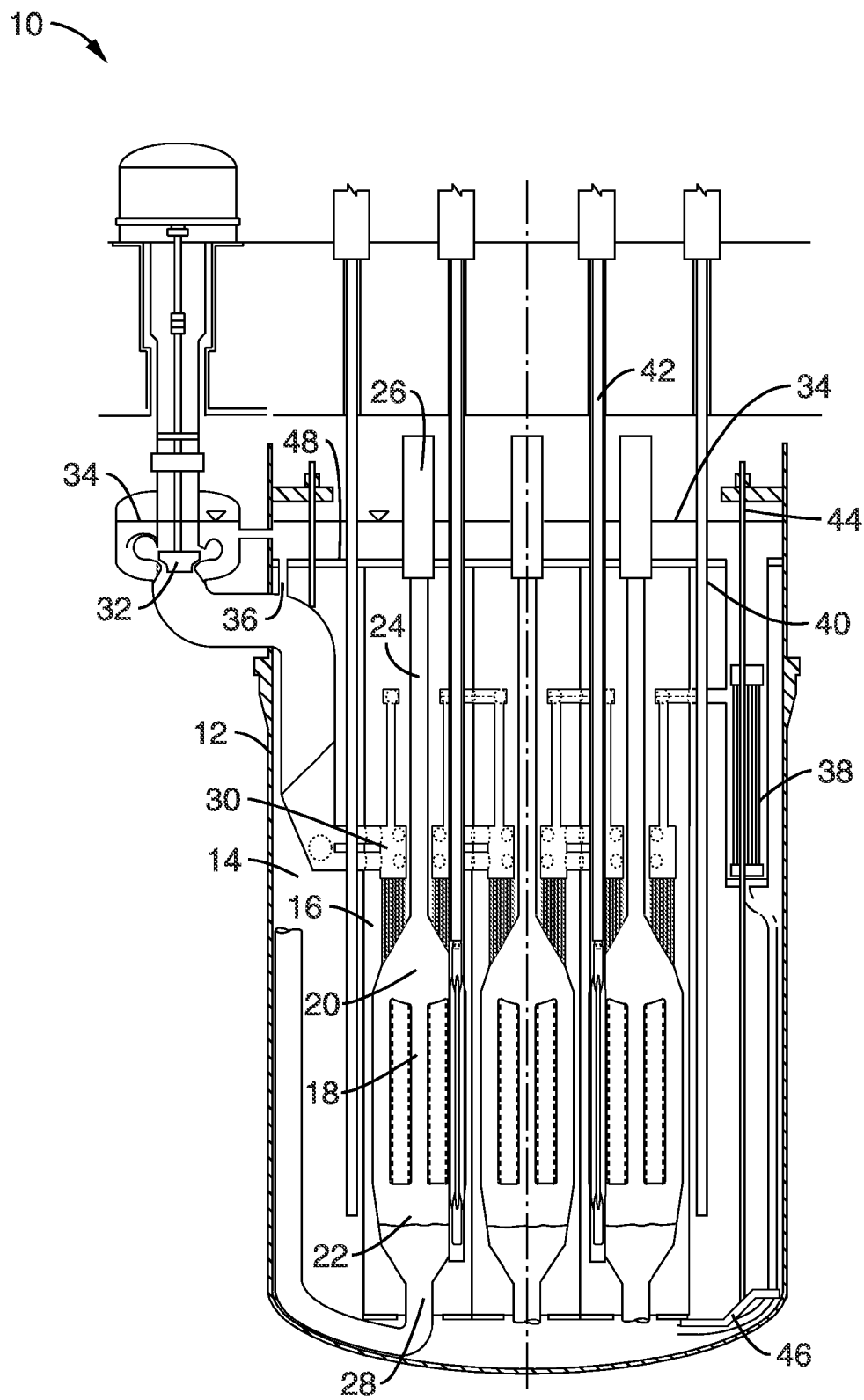
FIG. 1 is a schematic cutaway side elevation view of an embodiment of a high-temperature, liquid-fluoride-salt cooled pebble channel reactor according to an aspect of the present invention.

By way of example, and not of limitation, the invention pertains to a compact, liquid salt cooled, modular pebble bed advanced high temperature reactor (PB-AHTR). The reactor preferably uses an annular fuel pebble comprising an inert graphite center kernel, a TRISO fuel particles region, and a graphite outer shell, with an average pebble density lower than the density of the liquid salt so the pebbles float. The pebbles are introduced into a coolant entering the reactor and are carried into the bottom of the reactor core, where they form a pebble bed inside a plurality of vertical channels inside replaceable Pebble Channel Assemblies (PCAs). Pebbles are removed through defueling chutes located at the top of each PCA. Each PCA also includes channels for insertion of neutron control and shutdown elements, and channels for insertion of core flux mapping and other instrumentation. The PCAs are surrounded by a graphite permanent radial reflector to provide neutron shielding to the reactor vessel wall. Vertical buoyancy and pressure loads are transferred to the metallic reactor vessel near the top of the reflector. During assembly of the radial reflector and heating and filling of the reactor vessel, the graphite blocks are held in compression by metal tie rods extending from the top of the reactor to a metal reflector support ring below the reflector. The reactor uses overhung centrifugal primary pumps, with an anti-siphon vent on the pump suction pipes to prevent ingestion of cover gas if the primary salt inventory is reduced.

In one beneficial embodiment, the reactor has a nominal power output of 900 MWth and uses a core inlet/outlet temperature of 600° C./704° C., thereby allowing the use of currently available and code-qualified materials for construction. The reactor delivers heat at an average temperature of 652° C., the same average temperature as the General Atomics GT-MHR (core inlet/outlet temperature of 450° C./850° C.), and thus achieves the same power conversion efficiency of ~46%. Natural circulation of the liquid coolant provides highly effective thermal coupling of the fuel with the large mass of graphite reflector material, so the peak rise in the core outlet temperature is less than 30° C. under loss of forced cooling transients. The modular design achieves a nominal core average power density of 20 MW/m$^3$ to 30 MW/m$^3$, compared to 4.8 MW/m$^3$ for the PBMR and 6.5 MW/m$^3$ for the GT-MHR, which are cooled by high-pressure helium. High power density is achieved due to the effective heat transfer provided by the coolant, and by a novel pebble-channel core configuration and the use of smaller (3-cm diameter) pebbles. The design reduces the spent fuel volume to less than half that of a conventional helium cooled PBMR.

Our recent PB-AHTR work has shown that high power densities are possible compared to the typical maximum value of 6.5 MW/m$^3$ for modular helium cooled reactors. In this work that studied a large, cylindrical core configuration, pebble recirculation methods were verified experimentally (P. Bardet, J. Y. An, J. T. Franklin, D. Huang, K. Lee, M. Toulouse and P. F. Peterson, "The Pebble Recirculation Experiment (PREX) for the AHTR," submitted to Global 2007, Boise, Id., Sep. 9-13, 2007), neutronics simulations demonstrated that negative void reactivity can be achieved by increasing the heavy metal loading of the pebbles (M. Fratoni, F. Koenig, E. Greenspan, and P. F. Peterson, "Neutronic and Depletion Analysis of the PB-AHTR," Global 2007, Boise, Id., Sep. 9-13, 2007), and RELAP5-3D simulations showed that the increase in the core outlet temperature during a loss of forced cooling (LOFC) transient was quite small (A. Griveau, F. Fardin, H. Zhao, and P. F. Peterson, "Transient Thermal Response of the PB-AHTR to Loss of Forced Cooling," Global 2007, Boise, Id., Sep. 9-13, 2007). These studies led to the conclusion that the PB-AHTR can achieve power densities between 15 MW/m$^3$ to 30 MW/m$^3$, and that the reduced leakage from the core allows up to a 20% higher discharge burn-up, for the same initial enrichment, compared to an annular MHR core design.

Exemplary Embodiments of the Invention

Practical embodiments of a liquid-salt cooled high temperature reactor according to the invention will now be described. Beneficially, the reactor employs a novel design using pebble fuel in a pool configuration that provides high intrinsic safety. The design provides several important advances over the state of the art, including, but not limited to, (i) providing a method to recirculate fuel pebbles in the reactor core to permit refueling; (ii) providing a method fabricate pebbles that are buoyant in the coolant and have reduced stored energy; (iii) providing a method to passively or actively insert control elements into the center region of the core to control the reactor power; (iv) providing a method to increase moderation of neutrons in the core and to allow higher pebble heavy metal loading; and (v) providing a method to prevent ingress of cover gas into the core under forced circulation if the primary salt inventory is reduced. In each of these respects the design differs in important ways from the state of the art for helium-cooled pebble bed reactors and other reactor designs.

Example 1

Generalized Embodiment of Pebble Fuel Reactor

Referring to FIG. 1 through FIG. 5, a generalized embodiment of a modular pebble bed advanced high temperature reactor 10 according to the present invention is shown. This exemplary reactor comprises a reactor vessel 12 with an outer graphite radial reflector 14 and a core formed by one or more replaceable graphite pebble channel assemblies (PCAs) 16 (the embodiment shown in FIG. 1 through FIG. 5 has seven PCAs). The reactor core is formed by fuel pebbles located in one or more pebble channels 18 and in upper plenums 20 and lower plenums 22 located in each PCA. The fuel pebbles are recirculated out of the core using defueling chutes 24 and defueling machines 26 located in each PCA. The recirculated pebbles are inspected for burn up and either replaced or reinjected into the coolant flow entering each of the PCA lower inlet plenums 28.

The pebble core is cooled by a liquid fluoride salt circulated vertically upward through the pebble channels 18 into a plurality of exit plenums 30, which collect the coolant flow into one or more hot legs taking the flow to one or more primary pump impellors 32. Under normal operation the coolant level 34 remains above the pump impellor(s). Under a loss of coolant accident where the primary pump(s) continue to operate, the pumping is stopped passively by an anti-siphon vent 36, sustaining the total coolant inventory above the minimum faulted level required for decay heat removal. Decay heat is removed by natural circulation heat transfer to a plurality of direct reactor auxiliary cooling heat exchangers 38.

Reactivity control for power is performed by adjusting the rate of fresh fuel pebble injection and by controlling the position of a plurality of control rods located in vertical channels 40 around the periphery of the reactor core. Reactivity control for shut down is performed by inserting a plurality of shut down rods located in vertical channels 42 in the middle region of the reactor core.

The graphite outer radial reflector blocks 14 are positively buoyant in the salt coolant under normal high-temperature operating conditions, but must be installed in the reactor under room temperature conditions without the salt coolant. For the initial installation of the these reflector blocks 14 in the cold reactor vessel, a plurality of tie rods 44 hold a lifting plate 46 that in turn carries the weight of the reflector blocks 14 and holds the stack of blocks against an upper hold-down structure 47. The tie rod tensioning system maintains a constant force during heat up of the reactor vessel, correcting for differential thermal expansion between the graphite blocks and the vessel. The lifting plate then holds the blocks in place as the molten salt coolant is added to the vessel, and the blocks then float upward against the upper hold-down structure 48, which transfers up-lift forces into the reactor vessel 12.

Figure 6:
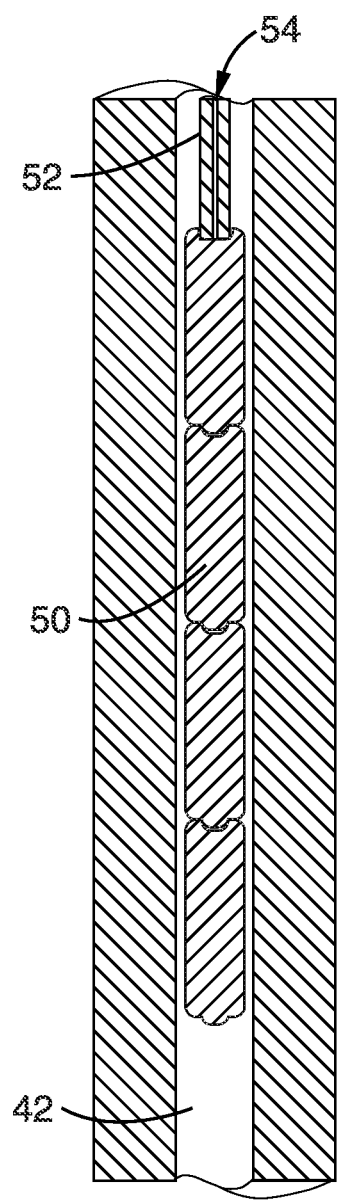
FIG. 6 is a schematic elevation view of an embodiment of a shutdown element channel safety element channel according to the present invention showing cylindrical neutrally buoyant control elements.

FIG. 6 shows a vertical cross section through one of the shut down rod channels 42 in FIG. 1 through FIG. 5. Here, channel 42 is shown with a buoyantly activated shut down rod that comprises one or more cylindrical neutrally buoyant control elements 50 containing a neutron absorbing material such as boron carbide or another neutron poison. The control elements 50 preferably comprise a mixture of high density graphite, low density graphite, and neutron poison that results in an average density such that the elements are neutrally buoyant at a coolant temperature above the normal core inlet temperature and below the normal core outlet temperature. Under normal reactor power operation some core inlet flow bypasses through the shutdown channel, maintaining the channel temperature sufficiently low that the elements float out of the core. Under transients and accidents where this temperature rises, the elements sink into the core to provide passive shut down. The bypass flow entering the channel may flow through a fluidic diode, such that hotter coolant enters the channel more rapidly following a loss of forced circulation. Forced insertion of the shut down elements occurs following a SCRAM signal, which causes a heavy activation rod 52 to drop by gravity and force the shut down elements into the core. A cylindrical hole 54 along the center of the activation rod 52 provides access for a laser range finding beam to independently measure the position of the control elements.

Figure 7:
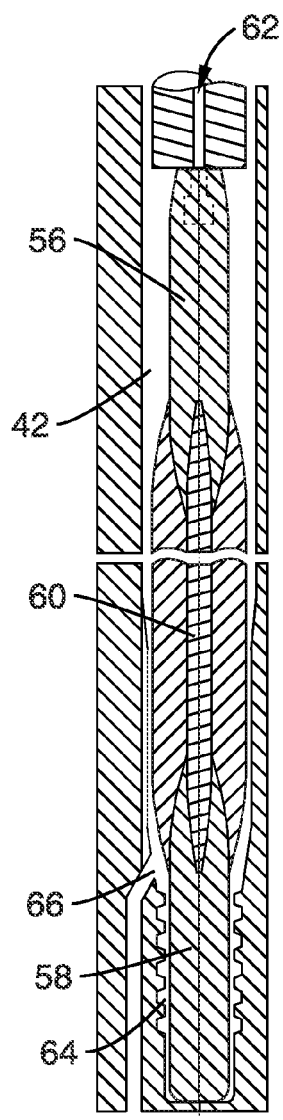
FIG. 7 is a schematic cross section elevation view of an alternative embodiment of a shutdown element channel according to the present invention showing a cruciform shaped neutrally buoyant shutdown element.
Figure 8:
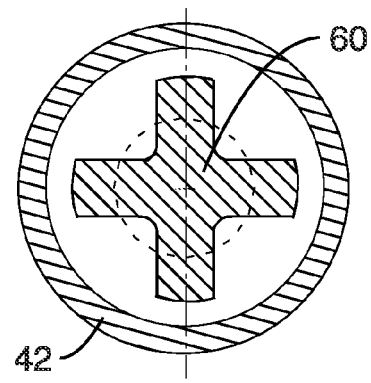
FIG. 8 is a schematic plan view of the shutdown channel element of FIG. 7 as seen from the upper end of the figure.

FIG. 7 shows a vertical cross section through one of the shut down rod channels 42 occupied by an alternative embodiment of a buoyantly activated shut down element. Referring also to FIG. 8, in this embodiment the element has a cylindrical top section 56 and bottom section 58, with the center section 60 having a cruciform geometry to maximize the rod neutron reactivity worth while minimizing the rod drag coefficient. The mass distribution in the element is adjusted so that the center of mass is located below the center of buoyancy to stabilize the rod in the vertical position. In this embodiment, forced insertion is provided by an activation element 62 that has a cylindrical hole along its center that provides access for a laser range finding beam to independently measure the position of the shut down element. Also in this embodiment, the element motion is slowed and kinetic energy dissipated by a hydraulic snubbing channel 64. Upon entering the snubbing channel, the cylindrical bottom end of the element 58 forces coolant to flow through the annular, ribbed gap between the snubbing channel and the rod, dissipating kinetic energy. Furthermore, the bypass coolant flow enters the channel from an opening 66 located above the snubbing channel.

Example 2

Generalized Spherical Fuel Pebble Design

Figure 9:
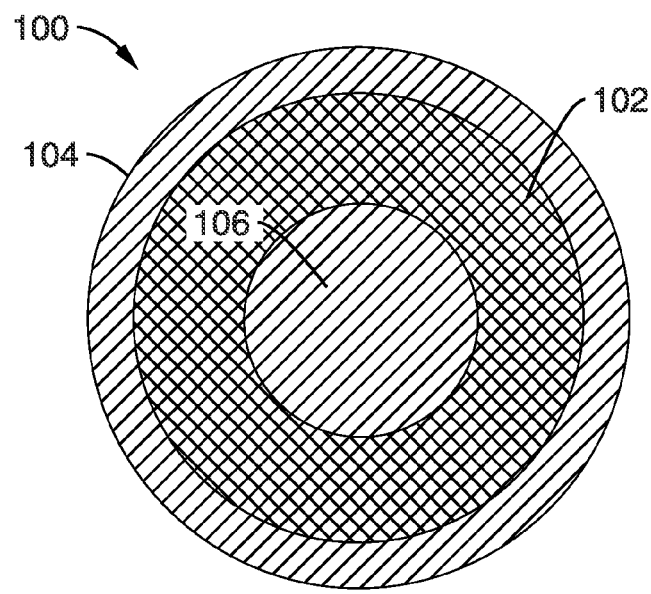
FIG. 9 is a schematic cross section view of an embodiment of an annular pebble according to the present invention.

FIG. 9 shows a cross section of a spherical fuel pebble according to an aspect of the present invention. The fuel, preferably comprising a mixture of TRISO fuel particles with a high-density, thermally conductive graphite binder, is contained in an annular region 102 and is protected by a high density, inert outer coating of graphite 104. The center kernel of the pebble 106 is a low-density graphite kernel. The density of this kernel is selected to adjust the average density of the fuel pebble to a value that provides an optimal buoyancy force. In particular, the density of the center kernel may be selected so that the ratio of the average density of the pebble to the coolant density is the same as the ratio of the density of polyethylene and the density of water, which may be used for scaled hydrodynamic experiments to verify pebble motion in the reactor core.

Example 3

Exemplary Reactor Design Parameters

Figure 10:
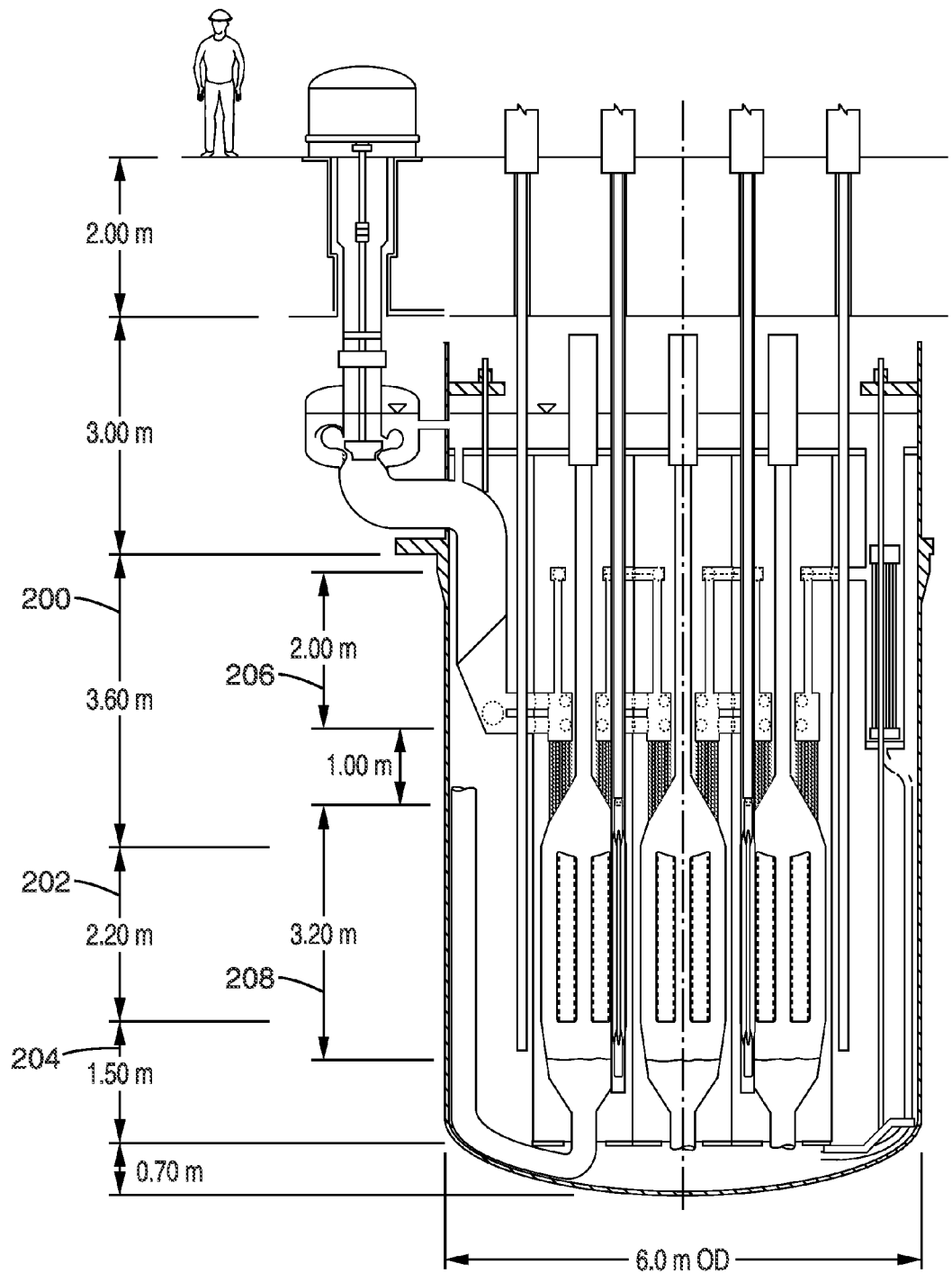
FIG. 10 through 12 illustrate exemplary dimensions associated with the reactor embodiment shown in FIG. 1 through FIG. 5.
Figure 11:
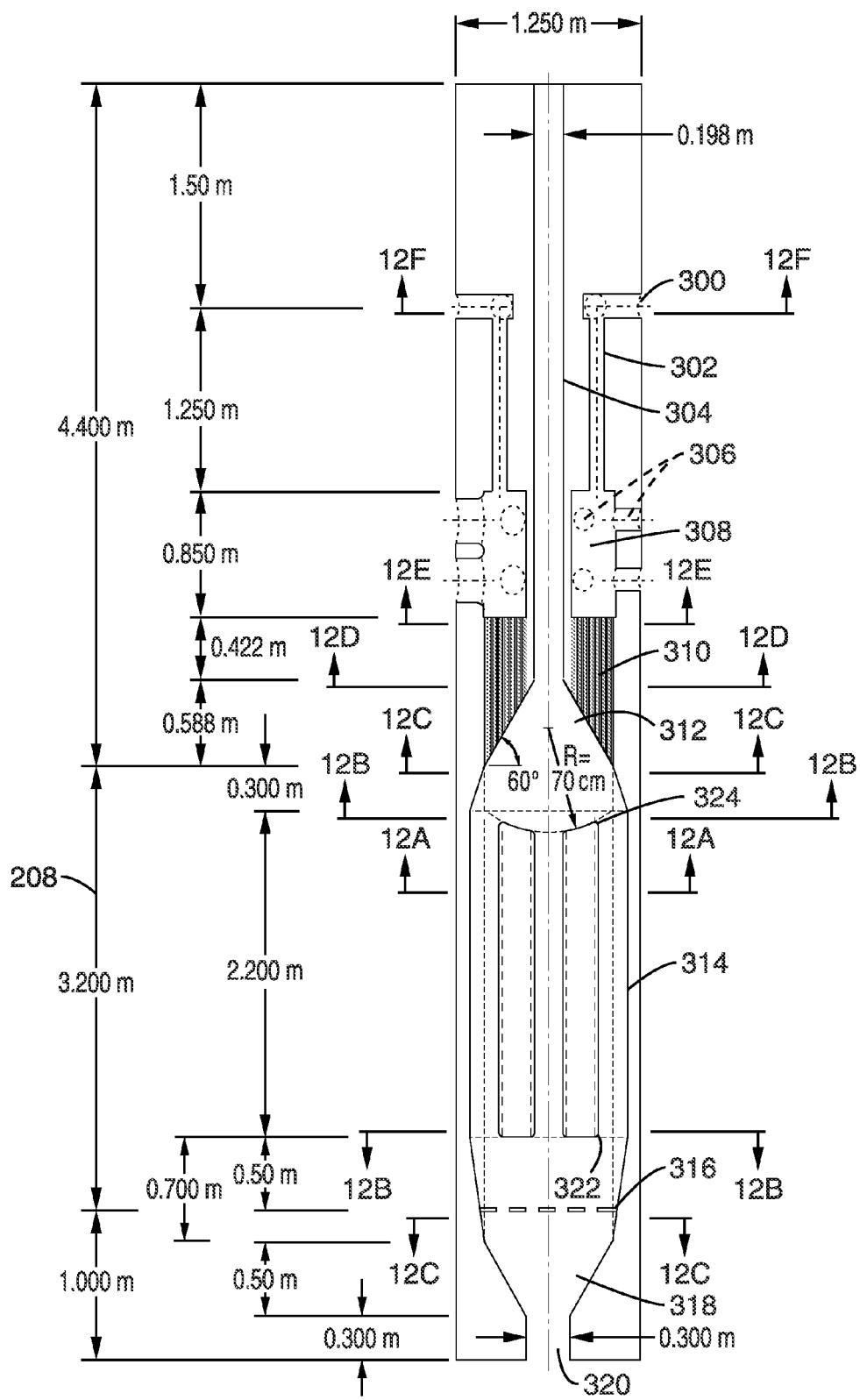

Referring also to FIG. 10 through FIG. 12, an exemplary 900-MWt Modular PB-AHTR reactor vessel is shown that is 10.5 m high and 6.0 m in diameter. FIG. 10 provides an example of the vertical dimensions for several sections of the reactor vessel as shown. It can be seen that, in this embodiment, the upper reflector structure has a height 200 of 3.60 m, the core channel region has a height 202 of 2.20 m, and the bottom reflector structure has a height 204 of 1.50 m. It can also be seen that the DHX effective height 206 is 2.00 m and that the core effective height 208 is 3.20 m.

Figure 12A:
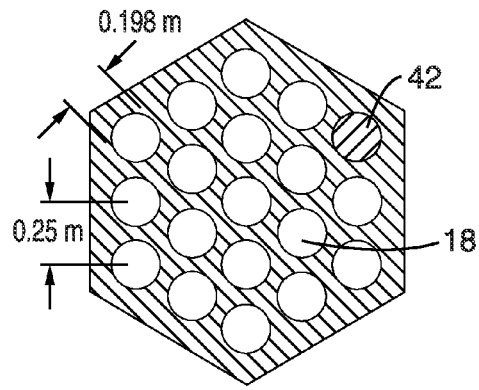
Figure 12B:
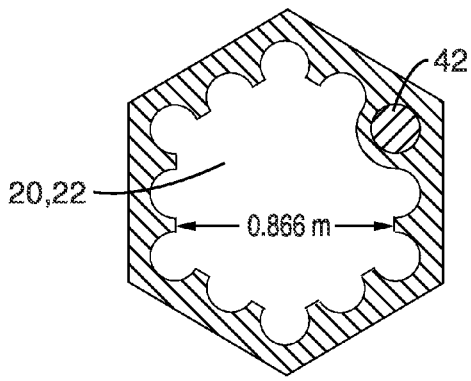
Figure 12C:
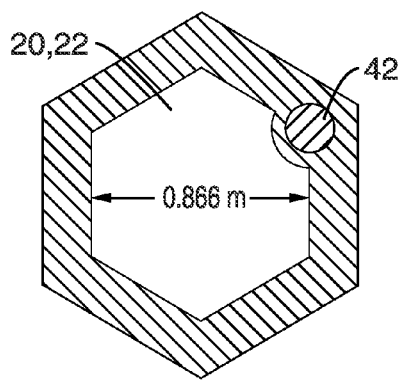
Figure 12D:
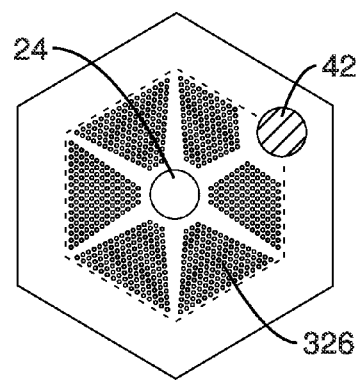
Figure 12E:
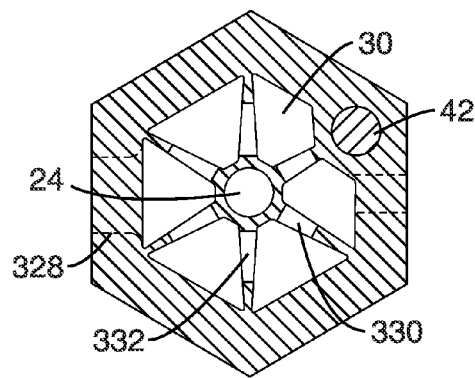
Figure 12F:
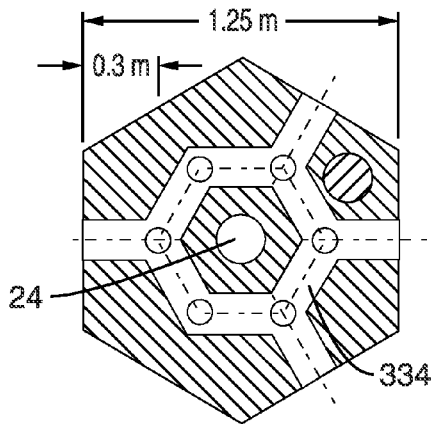

FIG. 11 provides an example of the vertical dimensions for several sections of the PCA. FIG. 11 also shows additional design details of the PCA such as the locations of DHX distribution plenums 300, 0.10 m φ risers 302, pebble defueling chutes 304, cross-flow openings 306, core outlet collection chambers 308, exit coolant flow channels 310, upper core pebble plenums 312, pebble channels 314, the bottom of the pebble beds 316, lower core pebble plenums 318, and the coolant inlets 320 from the cold legs. In this embodiment, all corners 322 are curved for pebble flow and all corners 324 have a 0.025 m radius. Referring also to FIG. 12A through FIG. 12F, additional exemplary dimensions are illustrated. Also shown in FIG. 12A through FIG. 12F is a shutdown rod channel 42 which is 0.198 m in diameter (FIG. 12C), 756 coolant holes 326 which are 0.015 m in diameter on 0.025 m triangular pitch (FIG. 12D), a 0.30 m φ out-flow openings 328 (FIG. 12E), collection chambers 30 (FIG. 12E), 0.15 m φ cross-flow openings 330 (FIG. 12E), 0.20 m φ cross-flow openings 332 (FIG. 12E), and 0.15 m φ interconnecting cross-flow channels 334 (FIG. 12F).

Figure 2:
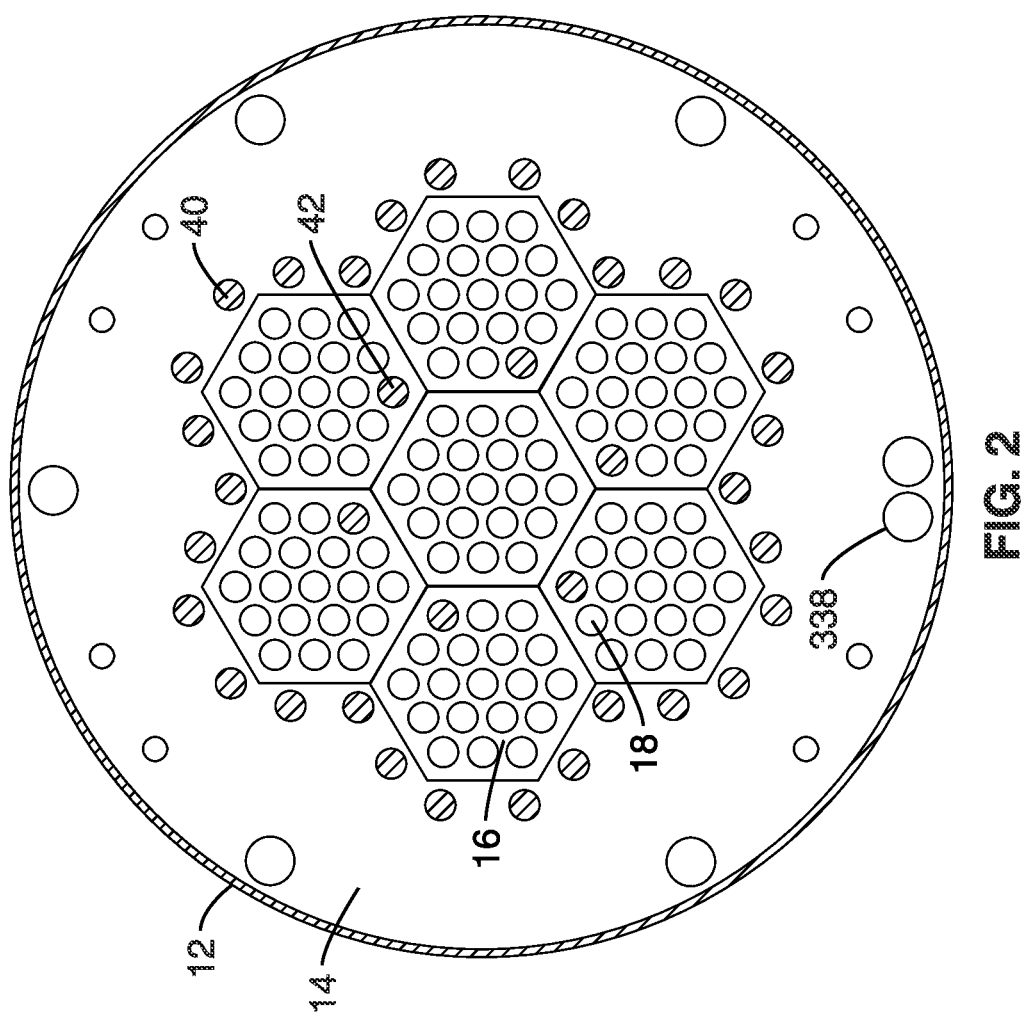
FIG. 2 is a schematic plan view of the reactor shown in FIG. 1 at the elevation of the pebble channels.
Figure 3:
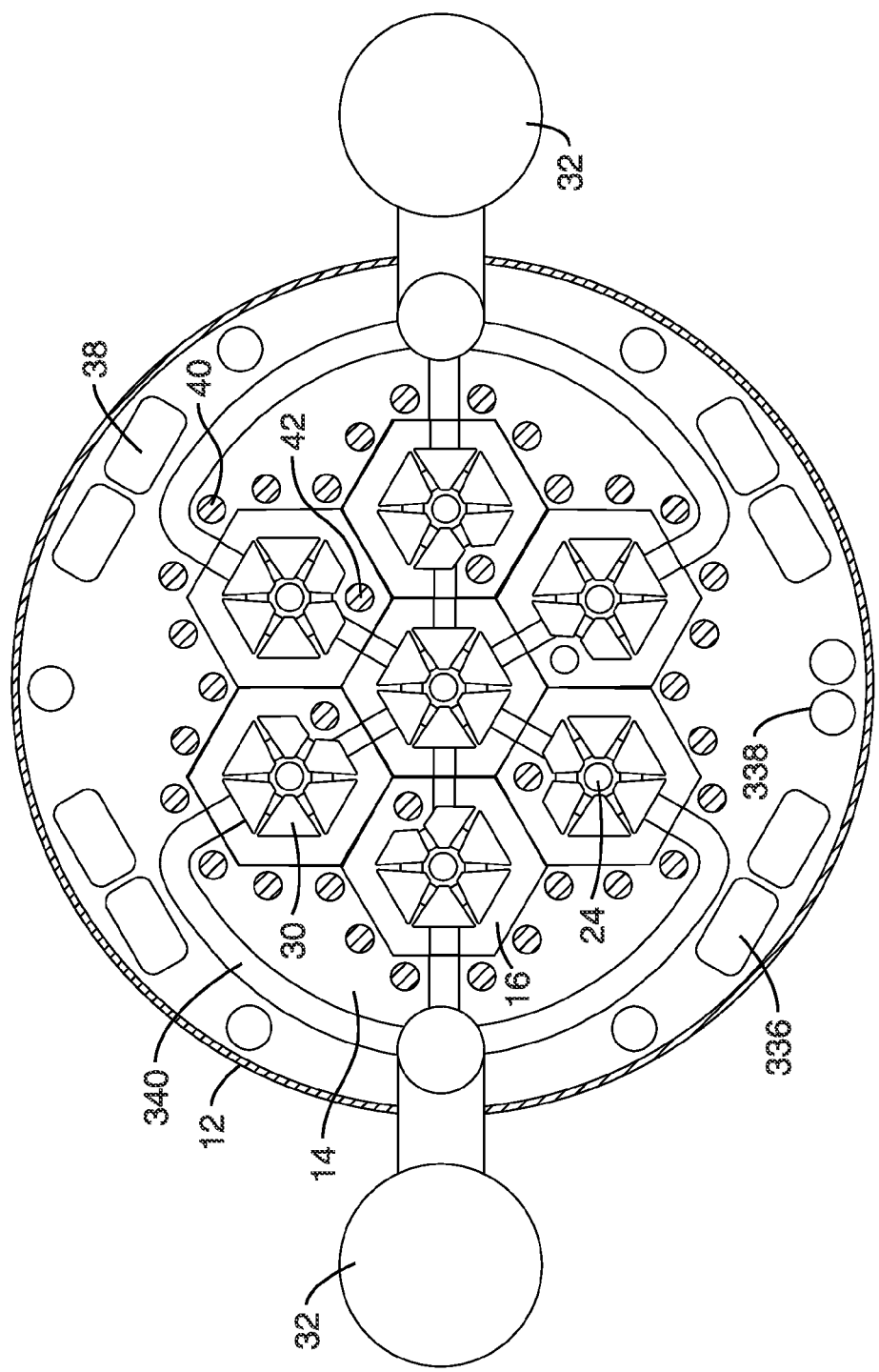
FIG. 3 is a schematic plan view of the reactor shown in FIG. 1 at the elevation of the coolant exit plenum above the reactor core.

In the exemplary core configuration for the reactor shown in FIG. 2, there are seven hexagonal pebble channel assemblies 16: 1.25 m across (flat to flat), with 0.198-m diameter pebble fuel channels on a 0.250-m center-to-center pitch. The volume fraction of pebble fuel channels is ~44% and the effective core height is 3.2 m. In the exit plenum configuration shown in FIG. 3, note that radial flow passes through multiple collection chambers to achieve effective mixing. DHX 336, cold legs 338, and core outlet collection channels 340 (0.2 m×0.5 m) can also be seen in these figures.

Figure 4:
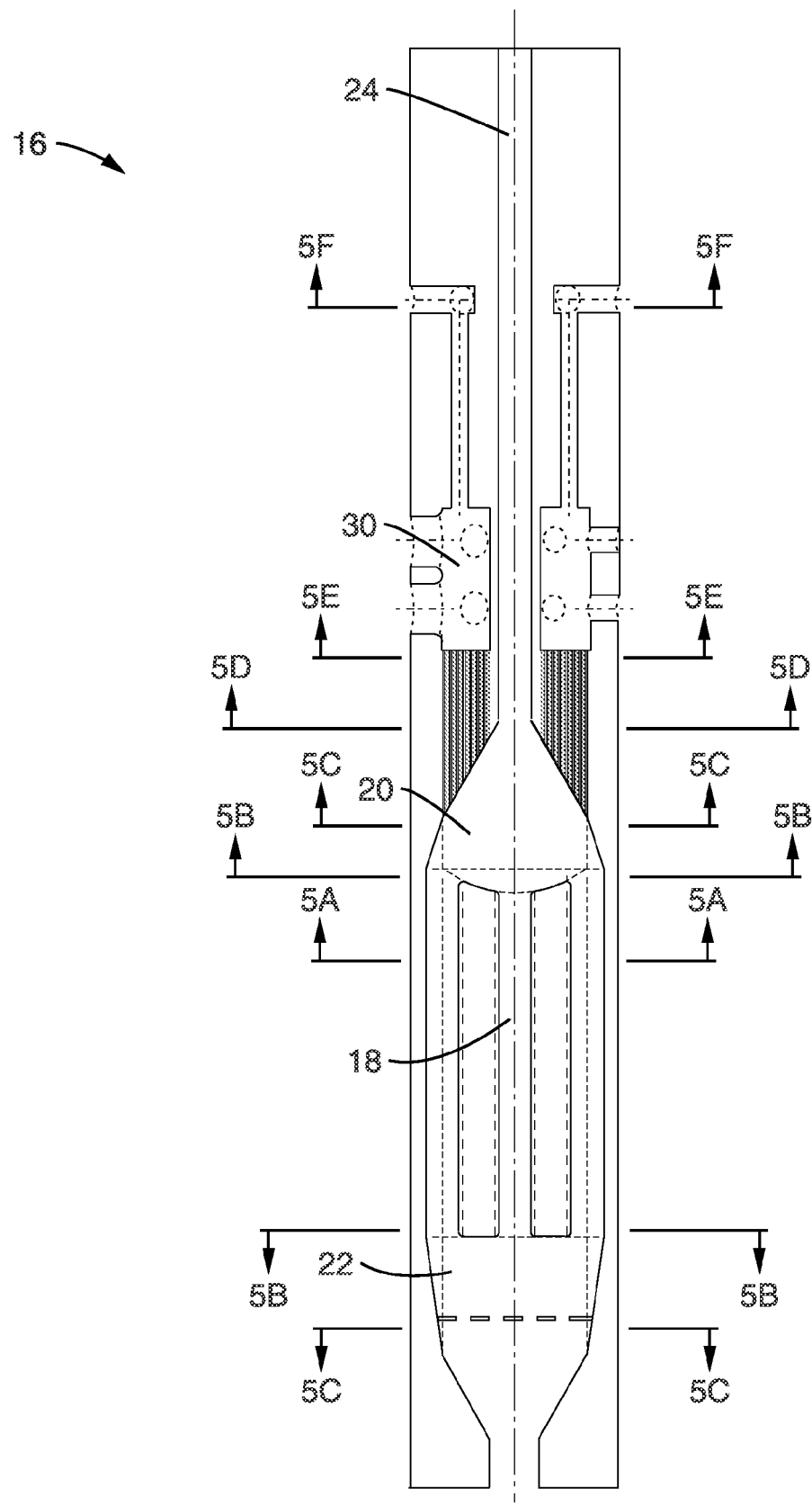
FIG. 4 is a detailed schematic elevation view of an embodiment of a Pebble Channel Assembly (PCA) according to the present invention.

In the embodiment illustrated, the reactor core comprises multiple, replaceable pebble channel assemblies (PCAs) 16 shown in detail in FIG. 4 and FIG. 5. In contrast to prior art, in the inventive liquid cooled high temperature reactor (HTR) design, pebbles are injected into the coolant entering a PCA. More particularly, (i) the pebbles are injected into the coolant flow entering the bottom of each PCA and are carried to the bottom of the pebble bed in the PCA; (ii) the pebbles are removed using a defueling chute located at the top of each PCA; and (iii) the pebbles flow up through a one or more pebble channels in each PCA, with 18 pebble channels used in the exemplary design.

The exemplary reactor vessel shown in FIG. 1 and FIG. 10 has an outer radial graphite reflector surrounding the PCA's, which provides neutron shielding to the reactor vessel. Because the graphite blocks have positive buoyancy in the salt and have a different thermal expansion coefficient than the vessel material, in the exemplary reactor the blocks are connected to the reactor vessel near the top of the vessel by an upper hold down structure so that buoyancy forces naturally compress the blocks, in contrast to conventional art for helium cooled reactors where the connection is at the bottom of the vessel and gravity forces compress the blocks. Moreover, in the exemplary reactor metal tie rods are provided, extending from the top of the reactor to a metallic support ring located below the radial reflector. During initial assembly of the radial reflector and subsequent heating and filling of the reactor vessel with salt, these tie rods are used to maintain the reflector in compression as the vessel undergoes thermal expansion and is filled with molten salt coolant.

The reactor shown in FIG. 1 and FIG. 10 has one or more primary centrifugal pumps with overhung cantilever shafts and seal bowls. The placement of the pump impellors at a high elevation in the primary loop limits the primary salt inventory loss that could occur due to a leak if the primary pumps continued and maintain a pressure at the leak location higher than the external pressure. In addition, the reactor shown in FIG. 1 and FIG. 10 has an anti-siphon vent line located at an elevation below the primary pump impellor that rapidly injects cover gas into the primary pump if the primary salt inventory drops to the level of the vent line, breaking the siphon and preventing the primary pump from ingesting gas at a lower flow rate, thus operating in a two-phase flow mode and injecting cover gas into the primary loop.

Example 4

Spherical Fuel Pebble Design

In a preferred embodiment, a pebble is manufactured using a combination TRISO fuel particles and normal and reduced density graphite, such that the average pebble density is lower than the salt density and the pebbles have positive buoyancy. In one embodiment of the exemplary pebble shown in FIG. 9, the kernel is approximately 1.98 cm in diameter, the annular region surrounding the kernel is approximately 0.52 cm thick, and the outer coating is approximately 0.5 cm thick. Adjusting the density of the graphite in this kernel allows the density of the pebble to be reduced to provide sufficient buoyancy, and reduces the thermal diffusion length and the pebble centerline temperature to reduce the pebble stored energy.

Example 5

PCA Design

Referring again to FIG. 4 and FIG. 5, each PCA may have multiple pebble channels located between an upper and lower pebble plenum. These pebble channels introduce additional graphite in the center of the reactor core, providing added neutron moderation and reducing the average volume fraction of salt and its contribution to parasitic neutron absorption. These pebble channels also transfer horizontal acceleration forces though the pebble bed in the event of seismic motion, reducing the motion of the pebbles relative to the reactor vessel and the potential to change reactivity due to expansion or compression of the pebble bed.

The PCA is fabricated from interlocking hexagonal or nearly hexagonal graphite blocks. To replace a PCA, the reactor may first be defueled by replacing the fuel spheres with inert graphite spheres. Following defueling, metallic connecting rods are inserted through the top cover plate of the PCA, down through the graphite blocks to the metallic bottom plate, where the rods connect using a latching mechanism similar to that designed previously for the MSBR. The PCA can then be lifted out of the reactor into a transfer cask for cooling, graphite disposal, and refurbishment, and a replacement PCA inserted.

Each PCA also preferably includes channels for insertion of neutron flux mapping and other instruments, channels for the insertion of temporary metal tie rods for PCA removal and replacement, and channels for insertion of neutron control elements. These cylindrical (or spherical) control elements, shown in FIG. 6 and FIG. 7/FIG. 8, comprise a mixture of graphite and boron carbide, or another neutron poison, in proportions to make the control element neutrally buoyant in the salt at a temperature intermediate between the normal core inlet temperature and the normal core outlet temperature. Under forced circulation operation, bypass flow from the core inlet or an intermediate location maintains the salt temperature in the channel below the neutral buoyancy temperature, so the elements float and remain outside the core. Under conditions where forced circulation stops, or where intermediate heat removal stops, heated salt enters the channel and the elements passively sink when this temperature exceeds the neutral buoyancy temperature. Depending on design of the gap around the elements, additional hydrodynamic forces may be applied to the elements by the bypass flow that can be optimized to further control the passive response of the element. Above the elements a high density control rod provides active insertion of the elements following a scram signal. A laser beam, or other instrument, is used to measure the vertical position of the control elements.

Example 6

Modular PB-AHTR Design and Analysis

In a helium cooled pebble bed reactor, the pebble diameter is limited to a minimum of approximately 6 cm to achieve an acceptably low pressure loss and recirculating power. Because liquid salts have very high volumetric heat capacity, pumping power is far smaller. Based on the earlier PB-AHTR results, therefore, in the exemplary modular PB-AHTR higher power density is achieved without increasing the fuel stored energy by using smaller pebbles (3 cm in diameter). Reducing the pebble diameter by a factor of two doubles the pebble surface area per unit volume, and halves the thermal conduction length scale in the pebble, allowing the power density to be increased by a factor of 4 with the same temperature difference from the surface to the center of the pebble and therefore the same stored energy. In addition, we consider it desirable to have the pebbles flow inside a number of separate channels, inside a set of graphite reflector blocks called a PCA, as shown in FIG. 1 through FIG. 5 and FIG. 10 through FIG. 12.

This configuration using PCA's has a number of potential advantages over the large, homogenous pebble core that was studied previously. Advantages of the modular design with pebbles located in large numbers of separate channels include, for example:

(a) The moderation provided by the PCA structure allows the heavy metal loading in the pebbles to be increased further, reducing the number of pebbles requiring fabrication and the spent fuel volume.

(b) The coolant void fraction in the core is reduced by approximately a factor of two, reducing parasitic neutron absorption in the coolant and increasing the discharge burn up.

(c) The heterogenous core configuration, where neutrons are moderated partially in the reflectors, reduces resonance absorption of neutrons and increases discharge burn up. However, the increased surface area of the exterior of the core does increase neutron leakage into the outer radial reflector, reducing the overall increase in discharge burn up.

(d) The multiple channel configuration allows a simple approach to a 2-zone core, where pebbles discharged from the six-Pebble Channel Assemblies (PCAs) in the outer zone are then circulated in the one PCA in the inner zone to drive the pebbles to higher burn up, flattening the power distribution in the core. In another embodiment a yet larger number of PCAs could be used to provide additional radial zones and increase the reactor power, for example three zones with nineteen PCAs.

(e) The solid reflectors provide locations for insertion of control elements. Passive reserve shutdown can be provided by neutrally buoyant shutdown elements that drop into the core when the coolant temperature in the control element channel exceeds the normal value, Control elements can be fabricated from a mixture of graphite (1700 kg/m$^3$) and boron carbide (2500 kg/m$^3$) to give the desired density.

(g) The channel configuration addresses the question of pebble bed motion and expansion or packing under seismic loading (although the PB-AHTR is a seismically base isolated plant). It is simpler to design and qualify for seismic loading than the solid central reflector of the helium-cooled PBMR that does not have horizontal support.

In the design shown in FIG. 1 through FIG. 5 and FIG. 10 through FIG. 12, the core-average power density is nominally 30 MW/m$^3$ and the average pebble channel power density is 60 MW/m$^3$. This results in a modular PB-AHTR with a 6.0-m diameter, 10.5-m high reactor vessel that can be more readily transported to the construction site and that operates at atmospheric pressure. This can be compared to the 9-m diameter, 31-m high reactor vessel for the 600 MWt GT-MHR that operates at 7 MPa. Even thought the core outlet temperature of the modular PB-AHTR is 704° C., allowing the use of available ASME code qualified materials, it achieves a similar 46% thermodynamic efficiency in power conversion because the average temperature of delivered heat is 652° C., the same as the average temperature provided by the GT-MHR.

The combination of greatly reduced reactor size (a factor of 9 smaller reactor vessel volume than the GT-MHR), high power conversion efficiency (equaling GT-MHR), and effective uranium utilization (20 to 40% greater than a conventional light water reactor) suggest that the modular PB-AHTR could have excellent economics.

Table 1 presents results of analysis showing that the pressure losses are larger for a 600 MWth modular PB-AHTR (which was subsequently uprated to 900 MWth), increasing from 0.73 bar for the large core, large pebble design, to 3.2 to 4.3 bar from the modular designs with 4.0 or 3.0 cm diameter pebbles. However the required pumping power is still quite low compared to the circulating power required for a modular helium reactor, and is similar to the pumping power required for pressurized water reactors.

The 900 MWt modular PB-AHTR is a convenient power output for initial commercialization, and it is sufficiently small to be attractive for co-generation applications to produce electricity and process steam for tar sands and heavy oil production, coal liquefaction, or ethanol distillation. Also, because the core is comprised of seven pebble channel elements, the AHTR Pilot Plant (APP) can use a single, full scale, full height channel element, operating at 110 MWt, and reproduce all of the steady state and transient phenomena for the full-scale plant. Due to its potential for superior economics, compatibility with the low enriched uranium fuel cycle, and passive safety, the 900 MWt modular and 110 MWt Pilot Plant PB-AHTR also qualify as a candidate competitor to the PBMR and Iris reactors as a small, exportable reactor.

Example 7

Modular PB-AHTR Thermal Hydraulics

Figure 13:
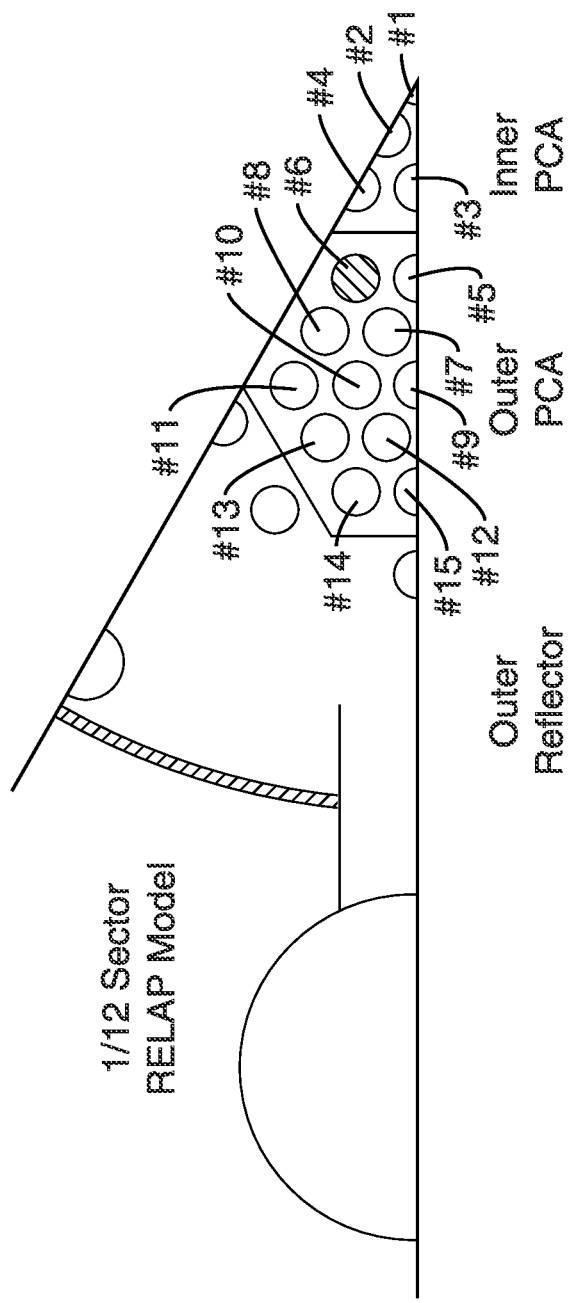
FIG. 13 is a schematic view diagram of a ¹⁄₁₂ sector RELAP5-3D model of a PB-AHTR core according to the present invention.

RELAP5-3D was used to assess the response of modular PB-AHTR to Forced Cooling (LOFC) and Anticipated Transient Without Scram (ATWS) transients (M. Fratoni, F. Koenig, E. Greenspan, and P. F. Peterson, "Neutronic and Depletion Analysis of the PB-AHTR," Global 2007, Boise, Id., Sep. 9-13, 2007). In the modular core, individual pebble channels may be modeled as separate flow channels connected by heat structures. FIG. 13 shows a $\frac{1}{12}$ sector RELAP5-3D model for the PB-AHTR core.

The reactor was modeled as having an inner Pebble Channel Assembly (PCA), consisting of $\frac{1}{12}$ of the center PCA, and an outer PCA consisting of $\frac{1}{2}$ of one of the 6 outer PCA's.

The inner PCA consisted of 4 pebble channels with common inlet and outlet plenums. The four pebble channels consisted of one $\frac{1}{12}$ channel (#1) and three $\frac{1}{2}$ channels (#2, #3, #4). Each channel communicates thermally with its neighboring channels through the PCA reflector graphite. Channels #3 and #4 communicate with the bypass flow in the gap between the inner and outer PCA's.

The outer PCA consisted of three $\frac{1}{2}$ channels (#5, #9, and #15) and seven full channels (#7, #8, #10, #11, #12, #13, #14). The safety rod location (#6) was modeled as consisting of $\frac{1}{2}$ of a pebble channel and 2 empty safety rod insertion channels. The outer pebble channels (#11, #13, #14, #15) communicate thermally with the reflector material and bypass flow in the gap between the outer PCA and the outer reflector. Two of the pebble channels (#8, #11) and the safety rod channel location (#6) communicate with the bypass flow in the gap between the outer PCA and its neighboring outer PCA.

Example 8

Modular PB-AHTR Neutronics

In the modular PB-AHTR the pebbles move inside pebble channels, and these graphite pebble channel assemblies provide additional moderation of neutrons. The two most important scaling factors affecting neutron transport in the modular core are the age of fission neutrons in graphite and the mean free path (mfp) of thermal neutrons in the pebbles. The latter is a strong function of the heavy metal (HM) loading (packing fraction).

The age in graphite (down to 1 eV) is 368 cm$^2$. This means that the mean distance (straight line) a fission neutron travels in graphite until its energy gets below 1 eV is [SQRT (6*Age)]~47 cm. For comparison, in water it is 12.7 cm and in heavy water 28 cm.

The modular PB-AHTR is somewhat similar, from the viewpoint of heterogeneity, to a CANDU type core with heavy-water moderator outside the fuel channels. This heterogeneity provides resonance self shielding which helps increase the achievable fuel discharge burn up. But in the PB-AHTR there is more moderation in the fuel (pebble bed) channel. This extra moderation complicates the estimation of how much macro self-shielding can be achieved in the modular AHTR without performing detailed neutronic calculations.

A first estimate of the channel diameter for the modular AHTR can be obtained by requiring that its diameter will be comparable to the diameter of the fuel cluster of the CANDU when measured in terms of the mean free path (MFP) of thermal neutrons. It will vary with the packing fraction.

Typical CANDU fuel bundles are 10 cm in diameter, on a 28.6 cm square lattice. The exemplary modular PB-AHTR design has 19.8 cm diameter pebble channels on a (approximately) 25 cm hexagonal lattice. This pebble channel diameter is very close to what one would recommend based on MFP scaling ((10 cm)(47 cm/28 cm))=16.8 cm. But the volume of moderator outside of the pebble channels is much smaller than for the fuel channels in the CANDU. This is necessary due to limits on the power density, pressure loss, and HM loading that can be achieved in the pebble channels. The closer spacing of pebble channels also should be helpful in reducing neutron leakage around the periphery of the reactor core.

In the exemplary design the pebble channels occupy approximately 50% of the volume of the core, so the modular core is approximately 30% pebbles, 20% salt, and 50% channel assembly graphite by volume, compared to 60% pebbles and 40% salt for a homogeneous pebble core. To maintain the same ratio of HM to moderator, the HM loading in the pebbles must be approximately doubled. This is reasonable. For a conventional salt cooled pebble core the optimal carbon to heavy metal ratio is C/HM=363 (Table IX, M. Fratoni, F. Koenig, E. Greenspan, and P. F. Peterson, "Neutronic and Depletion Analysis of the PB-AHTR," Global 2007, Boise, Id., Sep. 9-13, 2007). The corresponding kernel packing factor is 12.5% for homogeneous pebbles or 25% for annular pebbles. To maintain the same HM to moderator ratio the packing factor in the modular PB-AHTR must be doubled, to 50% for the annular pebble configuration, which would in turn halve the spent fuel volume. More commonly a packing factor of 40% is recommended, so the diameter of the internal kernel may be decreased. Kernel diameter, particle power, and uranium enrichment, are also key parameters that are optimized in the detailed design of the fuel.

Resonance self shielding at the kernel level has benefits for discharge burn up. For the homogeneous salt cooled pebble bed core, the maximum discharge burn up of 129 GWd/tHM for a 425 micron fuel kernel diameter drops down to 119 GWd/tHM for fuel with 225 micron kernels (FIG. 4, Fratoni, F. Koenig, E. Greenspan, and P. F. Peterson, "Neutronic and Depletion Analysis of the PB-AHTR," Global 2007, Boise, Id., Sep. 9-13, 2007). The heterogeneous core of the modular PB-AHTR with the higher HM loading in the pebbles should provide some additional resonance self shielding, which may have some further beneficial effect on discharge burn up and fuel utilization. Equally important is the 50% reduction in the volume fraction of the core occupied by salt, which will roughly halve the parasitic absorption of neutrons in the salt. On the other hand, the modular PB-AHTR will have higher neutron leakage due to the smaller size and larger surface area of its core. Detailed analysis is needed to determine what the net impact is on the fuel discharge burn up.

Example 9

Modular PB-AHTR Reactor Vessel Design

The baseline modular PB-AHTR reactor vessel is fabricated from Alloy 800H, with an internal, non-structural cladding of Hastelloy N to assure high corrosion resistance. An exemplary vessel according to FIG. 10 is D=6.0 m in outside diameter and the maximum level of salt in the 10.5-m tall vessel is 10.0 m.

For the purpose of estimating the required vessel thickness, the allowable stress is determined by the following logic. The normal operating temperature of the vessel is the core inlet temperature, 600° C. For conservatism to account for gamma heating, the steady state operating temperature of the vessel is taken as 650° C. and the vessel must operate with sufficiently low stress to avoid significant creep over the lifetime of the vessel (60 years). Under LOFC transients and ATWS accidents, the vessel can reach higher temperatures for limited periods of time. Under these conditions the requirement is to maintain stresses below the yield stress, while checking to assure that creep deformation will be small for the anticipated duration of such transients. Under LOFC and ATWS transients the pumps do not operate, so pressures in the vessel arise from hydrostatic loads only.

Referring to Table 2, a yield stress of 70 MPa was selected as representative in the temperature range from 850° C. to 900° C. where ATWS transients might reach. LOFC transients are expected to have much lower peak temperatures (under 750° C.). At 650° C., the stress required to provide a creep rate of 0.00001 percent per hour is 90 MPa. At this stress level, 11.4 years is required to provide 1% deformation. Considering yield stress and creep, a maximum stress level of 70 MPa is indicated. For conservatism, a safety factor of 2 is taken, and the average vessel thickness is estimated for a stress level of 35 MPa.

For steady, full power operation the pressure P in the vessel is established by the combination of the hydrostatic pressure (190 kPa) and the pressure loss from the core inlet plenum to the primary pump suction (530 kPa). To achieve a principal stress of $\sigma_p=(\sigma_1^2\sigma_2^2)^{1/2}=35$ MPa, a vessel wall thickness of t=7 cm is required, to sustain the hoop stress of $\sigma_1$=PD/2 t=31.0 MPa and axial stress of $\sigma_2$=PD/4 t=15.5 MPa. This vessel thickness can be compared to the 5 cm thickness of the S-PRISM vessel, which is 9.0 m in diameter and 20 m high. The total mass of the PB-AHTR reactor vessel, not including the top flange, is then approximately 120 metric tons.

Although the description above contains many details, these should not be construed as limiting the scope of the invention but as merely providing illustrations of some of the presently preferred embodiments of this invention.

For example, the present invention is not limited to use with pebble fuel elements. The PCAs could alternatively be loaded with fuel elements have different geometries and density characteristics where the fuel elements may or may not be buoyant in the salt coolant. Where other than pebble fuel elements are used, the PCAs described herein would be more generally referred to as fuel channel assemblies (FCAs). Those skilled in the art will appreciate that different fuel configurations may require modifications to the PCA/FCA which would not depart from the scope of the invention described herein. For example, with pin fuel, the FCA would have channels extending its full length, and the fuel assembly may include a graphite plug above it to fill in the upper portion.

Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

TABLE 1

Comparison of pressure losses and pumping power for integral and modular PB-AHTR cores based on Ergun equation, for bed void fraction of 0.4 and pump efficiency of 0.7.

|  | Integral | Modular | Modular |
| --- | --- | --- | --- |
| Pebble diameter (cm) | 6.0 | 4.0 | 3.0 |
| Thermal power (MWt) | 2400 | 600 | 600 |
| Power density in flow channels (MW/m$^3$) | 10.3 | 40 | 40 |
| Number of flow channels | 1 | 127 | 127 |
| Diameter of flow channels (m) | 6.70 | 0.198 | 0.198 |
| Average height of core (m) | 6.61 | 3.84 | 3.84 |
| Core inlet/outlet temperature (° C.) | 600/704 | 600/704 | 600/704 |
| Core mass flow rate (kg/sec) | 9670 | 2417 | 2417 |
| Average coolant flow velocity (m/s) | 0.14 m/s | 0.315 | 0.315 |
| Core pressure drop (kPa) | 73 | 320 | 430 |
| Core (only) pumping power (kW) | 514 | 564 | 756 |
| Core (only) specific pumping power (kW/MWt) | 0.214 | 0.940 | 1.260 |

TABLE 2

Tensile Properties And Hardness Of Alloys 800H And 800HT At High Temperatures

| Temperature | | Hardness | Tensile Strength | | Yield Strength (0.2% Offset) | |
| --- | --- | --- | --- | --- | --- | --- |
| ° F. | ° C. | BHN | ksi | MPa | ksi | MPa |
| 80 | 27 | 126 | 77.8 | 536 | 21.7 | 150 |
| 800 | 425 | — | 67.5 | 465 | 18.8 | 130 |
| 1000 | 540 | 90 | 62.7 | 432 | 13.0 | 90 |
| 1200 | 650 | 84 | 54.8 | 378 | 13.5 | 93 |
| 1300 | 705 | 82 | 47.7 | 329 | 15.8 | 109 |
| 1400 | 760 | 74 | 34.2 | 236 | 13.1 | 90 |

What is claimed is:

1. A fuel channel assembly (FCA) reactor core, comprising:
at least one FCA having a plurality of fuel elements;
the at least one FCA comprising:
a lower coolant inlet, a lower element plenum, at least one fuel element channel, an upper fuel element plenum, and a defueling chute;
a plurality of coolant holes with diameters smaller than the fuel elements, the coolant holes positioned above the upper fuel element plenum to collect outlet flow of salt coolant to an exit plenum;
a plurality of flow channels positioned above the fuel element exit plenum to collect outlet flow of salt coolant for transfer to a heat exchanger for removal of decay heat during loss of forced cooling; and
one or more shutdown control channels disposed in the reactor core; said control channels being adjacent to and separate from said fuel element channel.

2. A FCA reactor core as recited in claim 1:
wherein each fuel element comprises an inert, low-density graphite kernel, an annular fuel layer around the kernel that comprises TRISO particles and graphite binder, and a graphite outer shell around the annular fuel layer; and
wherein the low-density graphite kernel is configured such that adjustment of the density of the kernel controls the total buoyancy of the pebble fuel element.

3. A FCA reactor core as recited in claim 1, further comprising at least one neutron absorber element positioned in each shut down control channel.

4. A FCA reactor core as recited in claim 3, wherein the neutron absorber elements comprise a mixture of graphite and a neutron poison.

5. A FCA reactor core as recited in claim 4, wherein the neutron poison comprises boron carbide.

6. A FCA reactor core as recited in claim 3:
wherein quantity and density of the neutron absorber elements are selected to provide neutral buoyancy in salt coolant at a temperature between FCA inlet temperature and FCA outlet temperature; and
wherein the neutron absorber elements are configured to passively sink into the FCA upon the temperature of the shut down control channel exceeding the neutral buoyancy temperature.

7. A FCA reactor core as recited in claim 3, further comprising:
a control rod positioned above the neutron absorber elements;
the control rod operable to force insertion of the neutron absorber elements into the FCA.

8. A liquid fluoride salt cooled, high temperature reactor, comprising:
a reactor vessel;
a reactor core contained in the reactor vessel;
the reactor core comprising a plurality of parallel fuel channel assemblies (FCA's), each comprising;
a lower coolant inlet, a lower fuel element plenum, a fuel element channel, an upper fuel element plenum, and an upper defueling chute;
a plurality of moveable fuel elements;
a plurality of coolant holes with diameters smaller than the moveable fuel elements, said coolant holes positioned above the upper fuel element plenum to collect outlet flow of salt coolant to an exit plenum;
a plurality of flow channels positioned above the exit plenum to collect outlet flow of salt coolant for transfer to a heat exchanger for removal of decay heat during loss of forced cooling; and
one or more shutdown control channels disposed in the reactor core; said one or more control channels being adjacent to and separate from said fuel element channel.

9. A reactor as recited in claim 8:
wherein the moveable fuel elements comprise pebble fuel elements;
wherein each pebble fuel element comprises an inert, low-density graphite kernel, an annular fuel layer around the kernel comprising TRISO particles and graphite binder, and a graphite outer shell around the annular fuel layer; and wherein the low-density graphite kernel is configured such that adjustment of the density of the kernel controls the buoyancy of the pebble fuel element.

10. A reactor as recited in claim 8, further comprising at least one neutron absorber element positioned in each shut down control channel.

11. A reactor as recited in claim 10, wherein each said neutron absorber element comprises a mixture of graphite and a neutron poison.

12. A reactor as recited in claim 11, wherein the neutron poison comprises boron carbide.

13. A reactor as recited in claim 10:
wherein quantity and density of the neutron absorber elements are selected to provide neutral buoyancy in salt coolant at a temperature between FCA inlet temperature and FCA outlet temperature; and
wherein the neutron absorber elements are configured to passively sink into the FCA upon the temperature of the shut down control channel exceeding the neutral buoyancy temperature.

14. A reactor as recited in claim 10, wherein salt coolant flows into the shut down control channel from an inlet plenum under forced circulation.

15. A reactor as recited in claim 10, further comprising:
a control rod positioned above the at least one neutron absorber element;
wherein the control rod is operable to force insertion of the neutron absorber elements into the FCA.

16. A reactor as recited in claim 10, further comprising:
a graphite radial reflector connected to the reactor vessel near the top of the vessel;
wherein the graphite radial reflector comprises a plurality of reflector blocks configured to float in said coolant; and
metal rods extending from the top of the reactor vessel to a metal reflector support structure below the graphite radial reflector, the metal rods maintaining the reflector blocks in compression during assembly, heating and filling of the reactor vessel.

17. A reactor as recited in claim 8, further comprising:
a primary pump to circulate salt coolant through the at least one FCA and through an intermediate heat exchanger;
wherein the primary pump is an overhung cantilever type pump;
wherein the primary pump includes a suction pipe; and
wherein the suction pipe includes an anti-siphon vent line to passively maintain salt coolant inventory.

* * * * *